United States Patent [19]

Farnsworth

[11] E Re. 29,649

[45] Reissued May 30, 1978

[54] CLEANING COMPOSITION

[76] Inventor: Albert M. Farnsworth, 616 N. Arizona Ave., Chandler, Ariz. 85224

[21] Appl. No.: 742,992

[22] Filed: Nov. 18, 1976

Related U.S. Patent Documents

Reissue of:

[64] Patent No.: 3,933,674
Issued: Jan. 20, 1976
Appl. No.: 547,786
Filed: Feb. 7, 1975

[51] Int. Cl.[2] ..... C11D 3/43; C11D 3/44; C11D 3/46; C11D 7/50

[52] U.S. Cl. ..... 252/171; 134/40; 252/89 R; 252/153; 252/162; 252/170; 252/557; 252/DIG. 5; 252/DIG. 8; 252/DIG. 14

[58] Field of Search ..... 252/118, 153, 162, 170, 252/171, DIG. 5, DIG. 8, 557, DIG. 14, 89; 134/40

[56] References Cited

U.S. PATENT DOCUMENTS

| | | | |
|---|---|---|---|
| 2,262,508 | 11/1941 | Little | 252/171 |
| 3,030,238 | 4/1962 | Cohn | 134/40 X |
| 3,277,013 | 10/1966 | Gianladis | 252/118 |
| 3,528,922 | 9/1970 | Wagner | 252/118 |
| 3,637,512 | 1/1972 | Matson | 252/171 X |
| 3,775,334 | 11/1973 | Christie | 252/171 |
| 3,843,780 | 10/1974 | Michaels | 252/170 X |
| 3,901,726 | 8/1975 | Snearly | 252/171 X |

OTHER PUBLICATIONS

Coleman, R. L., et al.: "Potential Uses of Distilled Orange Oils," *The Citrus Industry,* vol. 55, No. 2, Mar. 1974, p. 20821.

Chem. Abstracts, vol. 84, p. 135, 46453n, "D-Limonene as a Degreasing Agent," 1975.

Roberts; J. D. et al.: Basic Principals of Organic Chemistry, published by W. A. Benjamin, Inc., New York, 1964, p. 1140.

Rose; A. & E., The Condensed Chemical Dictionary, Sixth Ed., Reinhold Publishing Co., New York, 1962, pp. 404 & 405.

*Primary Examiner*—Dennis L. Albrecht
*Attorney, Agent, or Firm*—Cahill, Sutton & Thomas

[57] ABSTRACT

The composition disclosed consists primarily of a hydrocarbon oil of approximately the kerosene boiling range, preferably deodorized, in proportions of 5 to 92% by weight, preferably about 60 to 80%, based on the total composition, a limonene type solvent oil in proportions of 5 to 90%, preferably 20 to 35%, about 0.5 to 6% of lanolin or equivalent wool grease lubricating agent for the skin, and about 0.5 to 2.0% of a surface active agent, preferably of the aerosol type, such as "Aerosol OT" or equivalent.

10 Claims, No Drawings

CLEANING COMPOSITION

Matter enclosed in heavy brackets [ ] appears in the original patent but forms no part of this reissue specification; matter printed in italics indicates the additions made by reissue.

BACKGROUND AND PRIOR ART

Many types of cleaning compositions are known for removing greases, tars, resins, waxes and many other contaminants from various surfaces. In general, these must act as solvents, or at least as softeners, for the material to be removed. Contaminants commonly include several ingredients, some of which are more difficult to remove or dissolve than others. Hence, it is quite a common practice to use very powerful solvents in cleaning compositions, particularly when the contaminants are particularly hard to remove. These may be used where there is no contact with the human body, but in other cases it is necessary to take stringent precautions so that the cleaning material will not cause injury to persons using it. The more powerful solvents, such as the lower ketones and mixed ketones, aldehydes, chlorinated hydrocarbons, certain of the lower acids and alcohols, and benzene type hydrocarbons and their derivatives are often highly injurious to the human skin or to sensitive organs of the body such as the eyes and/or the respiratory organs and other parts, particularly the mucosae. Many of these powerful solvents are quite toxic and they must be used only with body protection, often requiring complex ventilating systems and/or liquid proof gloves and other protective devices or clothing.

Another objection to many of the more effective solvents is that they will also remove or tend to remove paints, varnishes and other decorative or protective coatings from the surfaces with which they come into contact. This property of course often limits the usefulness of the more powerful solvents, such as the ketones, aldehydes, lower alcohols and acids, and some of the chlorinated solvents that are so often used. Such materials are used generally in combinations.

Among materials that have been particularly difficult to remove, and which must be removed without injury to human operators or to adjacent surface coatings, and the like, are such gummy or viscous materials as the residues of gel in so-called "jelly-filled" cables. These cables are used extensively in the communications industry, particularly for telephone trunk lines, underground lines and the like. The gel which is released, when the cables are cut or stripped for joining or branching, contaminates both the work and the worker and is quite obnoxious. Numerous solvents that might otherwise be employed for cleaning off such materials are too injurious to the skin of humans or to eyes or respiratory organs, or they may cause damage to painted, enameled or varnished surfaces, which rules out their use in many instances. Ordinary soap and water are not effective for removing materials such as those mentioned above.

Other types of resinous or gummy residue which are very hard to deal with, are the matrix materials commonly used by dentists for making dental prostheses. Being used in the human mouth, these materials cannot safely be removed by use of the more effective or potent solvents conventionally used for external purposes, because of toxicity and other harmful properties. Here again, the safer conventional materials are not sufficently effective for cleaning such viscous residue materials from teeth, gums and other parts of the oral cavity.

Typical compositions which have been suggested in the prior art for cleaning some of the more difficult soluble residues include those disclosed in the U.S. Pat. No. 3,335,807 to Keers which describes compositions for removing epoxy and urethane type resinous contaminants. The patented compositions comprise combinations of chlorinated aliphatic hydrocarbons and chlorinated or non-chlorinated benzene and benzene derivatives; they also include oxygenated derivatives of benzene such as phenol and cresol. Most of these materials, and most benzene type compounds are quite toxic or unsafe for intimate skin contact or for inhaling, and they are altogether unsuitable for purposes of the present invention.

A particular object of the present invention is to produce a cleaning composition which will safely remove, especially, the gel residues from jelly-filled cables, and the viscous dental contaminants mentioned above without injury to personnel involved. Of course, the new compositions may also be used for many other purposes. The specific purpose mentioned requires the use of solvents of adequate dissolving power which are free or substantially free of the objectionable toxic properties mentioned above, i.e., which are not irritating to the human skin or to eyes or respiratory organs or to mucosae in general. The invention also involves the use of ingredients which will offset the tendency of many solvents to remove the natural lubricants from the human skin or which will replace such lubricants if they are removed to a significant extent. It also involves the use of a main carrier oil or base that in itself is not injurious to the body and preferably unobjectionable because of odor. It involves, further, the use of a surface active agent which will enhance and accelerate the dissolving action of the composition on the contaminant material. It is contemplated that the materials of the present invention will come into extensive contact with the human body.

Many references in the prior art use some of these ingredients and some of them use more than one of them in combination. Some of the more pertinent prior art references with which the applicant is familiar will be mentioned.

In U.S. Pat. No. 2,942,008 to Labowe, there is disclosed a solvent composition designed for use in cosmetic and pharmaceutical applications, as well as in industrial, which contains mixtures of animal or mineral oils along with lower aliphatic alcohols, the latter being solubilized in the oils by use of some of the higher fatty alcohols, such as oleyl, lauryl, myristyl and/or cetyl alcohols and the like. These materials, while largely nontoxic, do not have the solvent properties required by the present invention.

U.S. Pat. No. 3,131,153, to Klausner, describes a variety of products, including self-propellant sprays for various purposes, such as for cosmetics, lathers, and paint removers. These are made up, in general, of ketones, polyhydric alcohols, lower aliphatic monohydric alcohols, and the like, and the compositions may also include perfumes. Obviously, these products are not suitable for purposes of the present invention because they lack solvent power, although some ingredients are included which would be soothing or lubricating to the human skin.

U.S. Pat. No. 3,625,763, to Melillo, describes a composition for stripping resinous coatings of the epoxy type from substrates such as printed circuit boards. Ingredients named include polychlorinated aliphatic compounds, along with ketones and alcohols; several of the ingredients described are highly toxic to the human skin and to other sensitive body parts and the compositions as a whole would not be suitable for purposes of the present invention. U.S. Pat. No. 3,640,884, to Schofield et al., describes a cleaning and degreasing composition which involves the use of highly chlorinated and fluorinated hydrocarbons, such as tetrachlorodifluoroethane, along with acetic acid, or other acids, etc., and some lower alcohols. One of the uses suggested is to clean printed circuit boards of resinous materials. The ingredients described in the patent may be suitable for that purpose but they include toxic materials and apparently they would be injurious, also, to painted or varnished surfaces. U.S. Pat. No. 3,661,641, to Vigh et al., also describes a composition for removing resins of polyurethane type from printed circuit boards, using such ingredients as toluene, ethanol, propanol and methanol. Methanol is somewhat toxic and toluene is even more so; moreover, these rather volatile materials are not suitable for purposes of the present invention, not having the solvency and staying qualities desired for dissolving the particular materials mentioned above.

U.S. Pat. No. 3,714,049, to Charle et al., describes a sprayable aerosol type cleaner for removing stains from surfaces, particularly where the stains are caused by fatty substances. The reference suggests use of a combination of fluoro-chlorinated hydrocarbon propellants, such as trichloromonofluoromethane, along with trichloroethylene or turpentine, carbon tetrachloride, etc., and a finely divided solid absorbing powder, such as silica or talc. Aside from including some skin irritating ingredients that are named, the composition does not appear to be suitable for purposes of the present invention.

Thus, the prior art compositions of which applicant is aware do not appear to have been directed to a solution of the problems for which the composition of the present invention is particularly suited and designed. For purposes of the present invention, the composition must not be too volatile; it needs adequate solvent power but must be free of toxicity, it must prevent skin deoiling or restore the oils as they are removed, and it must be made up of materials which are not significantly irritating to eyes, respiratory tract, or other sensitive body parts, while accomplishing the required cleaning function rapidly and effectively.

DESCRIPTION OF PREFERRED EMBODIMENT

As a starting material or base, the composition of the present invention is made up of a major fraction, preferably, of a hydrocarbon oil of the boiling range, or approximate boiling range of kerosene; preferably, however, it is free of kerosene odor, or substantially so. Lighter hydrocarbon fractions than this will evaporate too rapidly and will tend too strongly to de-oil the human skin. The material should stay on the surface to be cleaned long enough to permit full penetration of the solvent into the residue to be removed. A suitable base oil that is available commercially at moderate cost is a deodorized petroleum fraction having essentially the following characteristics:

| | |
|---|---|
| API gravity | 48–51 |
| Specific gravity | 0.775–0.788 |
| Saybolt Viscosity | 30–35 |
| Thermo viscosity | 400 |
| Flash point (open cup) | 170–180 |
| Flash point (closed cup) | 135–145 |
| Initial boiling point | 380–410 |
| Distillation end point | 480–510 |
| Unsulfonatable residue | 95% |
| Pour point, ° F. | −25 |
| Saybolt color | 30+(water white) |
| Odor | Practically none. |

The fraction described is freely miscible in all proportions with acetone, benzol, tertiary butyl alcohol, carbone tetrachloride, chloroform and diethylene chloride. It is freely miscible, also, with the vegetable oils such as olive oil China wood oil, linseed oil, and pine oil, as well as with mineral oils and oleic acid. Waxes, such as beeswax carnauba wax, ceresin, Japan wax, montan wax and parafin are at least somewhat soluble in it, as are also wuch miscellaneous materials as tallow, wool grease, rosin, petrolatum and many others. Average molecular weight is estimated to be about 154. Proportions of this oil may vary from 5 to 92$ by weight, based on total composition, usually 60 to 80%.

The second ingredient, largely responsible for the needed selective solvent action, apparently, is what may be called a limonene type oil, an extract obtained from citrus peels and the like, and consisting to a substantial extent of the terpene, limonene, $C_{10}H_{16}$. Limonene, per se, has a specific gravity of 0.853 and a boiling point of 176° C. This extract oil ingredient is preferably one obtainable commercially from the citrus industry; it is sometimes sold under the general trade name of "praline". Such materials are often sold as a soap grade or toiletry grade oil, used as perfuming or modifying agents. A typical product has these characteristics:

| | |
|---|---|
| Color | Very light yellow |
| Refractive index (20° C.) | 1.4719 |
| Specific gravity (25° C.) | 0.841 |
| Resin content, % | 0.10 |
| Aldehyde content, % | 0.29 |

A more general product of the same approximate composition, a limonene extract, has a refractive index which may vary from 1.4718 to 1.4722 at 20° C., optical rotation from 99.0 to 100.0, and a specific gravity from 0.838 to 0.843 at 25° C. Maximum permissible resin content for purposes of this invention is 0.10% and maximum aldehyde content (as decanal) is about 0.90% by weight. Either of the above limonene type products is suitable for use as the second ingredient in the composition of the present invention. Both of them consist largely of limonene, per se, and they will be understood hereinafter to be referred to by the expression, "limonene type" oil, extract, or ingredient. Such a citrus distillate is used in proportions, broadly, of 5 to 90% by weight, based on the total composition, but generally will be between about 20 and 35%, preferably within the range of 25 to 30% for the specific uses described hereinafter. For finer uses, this ingredient is of a good toiletry grade, as commonly used in hand and bath soaps.

To protect the skin of the user, especially the hands, and to enhance somewhat the solvent power of the cleaner, a third ingredient is added, selected from the group which consists of lanolin and wool grease. Refined lanoline preferably will be used for finer applications, e.g., for cleaning dental matrix residues, but the cruder wool grease is quite satisfactory for more general purposes, and specifically for cleaning the viscous, tarry, residues off jelly filled cables. Proportions of lanolin or wool grease may vary from 0.5 to 6% by weight, usually, preferably being within the limits of 2.0 to 3.5%. Particularly preferred proportions are 2.5 to 3.0%. The lanolin or weel grease not only gives protection to the skin against the solvents that would tend to remove the natural oils from the hands, for example, but it also replaces the oil which is removed by these and other materials. It leaves the hands soft and free from irritation. A particularly preferred composition contains about 70% of an odorless paraffinic oil of the kerosene boiling range, 26 to 27% of the higher grade limonene extract, about 2 to 3% of lanolin, and 0.5 to 1% of "Aerosol OT."

To accelerate or promote the cleansing action, a small amount of a surface active agent is added, usually about 1 to 2% by weight, although the broader range of 0.5 to 3% may sometimes be useful. This material may be of various suitable kinds, but the aerosol type suffactants are preferred, specifically, the dialkyl alkali metal succinates, especially dioctyl sodium sulfosuccinate, known commercially as "Aerosol OT". See, for example, Organic Chemistry, by Fieser and Fieser, Heath & Co., Boston, 1944, pp. 394–5. However, other surface active substances may often be used, such as sulfonated castor oil and analogous sulfonates, well known to the art, or the sulfate of long chain alcohols, such as are commonly marketed for use as detergents, under such trade names as "Gardinol", "Dreft", and others. The surface active agents facilitate wetting of the surface by the solvents and help to penetrate repellant materials which are often encountered.

Compositions have been made up consisting essentially of about 70% by weight of the base oil described above, 25 to 27% of the limonene type solvent oil, about 3% of lanolin and about 1% of an aerosol surfacant, specifically the Aerosol OT mentioned above. In order to make certain that these materials would be safe to handle, as well as to be sure they are effective cleansers, careful tests were made to measure primary skin irritation and toxicity to eyes and other sensitive organs. They are useful for the specific purposes mentioned above and for many other purposes, such as cleaning printers ink from machinery and from hands.

To test the composition of this invention for primary skin irritation, the abraded and intact skin of six albino rabbits, clipped free of hair, was treated with the new cleaning compound. Two areas of the animals' back, placed approximately ten centimeters apart, were designated for positions of test patches. One area was abraded by making incisions through the stratum corneum, but not sufficiently deep to disturb the derma or to produce bleeding. The patches consisted of two layers of light gauze, cut in squares of 2.5 centimeters, secured to the animals by thin bands of adhesive tape. The material to be tested, in portions of 0.5 milliliters in the case of liquids, or 0.5 grams dissolved in an appropriate solvent in the case of solids or semisolids, was introduced beneath the patch. The entire trunks of the test animals were then wrapped in clear plastic trunk bands, which helped to hold the patches in position and retarded evaporation of volatile substances during 24 hour exposures. The composition under test was applied so that there were two applications (one intact and one abraded) to each of the six animals. The animals were immobilized in a special holder during the 24 hour exposure period. Upon removal of the patches, the resultinng reactions were evaluated on the basis of the designated values in the Table I which follows below. Evaluations were made again after 72 hours, following application. The final score represents an average of the 24 and 72 hour readings. Point scoring was by the following method:

| | |
|---|---|
| A. Erythema and Eschar formation: | |
| Very slight erythema (barely perceptible) | 1 |
| Well defined erythema | 2 |
| Moderate to severe erythema | 3 |
| Severe erythema (beet redness) to slight eschar formation (injuries in depth) | 4 |
| B. Edema formation: | |
| Very slight edema (barely perceptible) | 1 |
| Slight edema (edges of area well defined by definite raising) | 2 |
| Moderate edema (area raised approx. 1 mm.) | 3 |
| Severe edema (raised more than 1 mm. and extending beyond area of exposure | 4 |
| Tabulation, $\frac{A+B}{4}$ = Irritation Index. | |

The degree of irritation, as established by the Applied Biological Sciences Laboratory, Inc., is as follows:

| Irritation Index | Degree of Irritation |
|---|---|
| 0 | Non-irritant |
| 0.1 to 0.9 | Slight irritant |
| 1.0 to 1.9 | Mild irritant |
| 2.0 to 2.9 | Moderate irritant |
| 3.0 to 3.9 | Irritant |
| 4.0 to 4.9 | Severe irritant |
| 5.0 or more | Product fails test |

Results of the above described tests are tabulated:

Table I

| A. Erythema and Eschar | Exposure time | | Mean Score, Expos. Unit Value |
|---|---|---|---|
| Intact skin | 24 | | 0.0 |
| Intact skin | 72 | | 2.50 |
| Abraded skin | 24 | | 0.0 |
| Abraded skin | 72 | | 3.17 |
| | | Subtotal | 5.67 |
| B. Edema | | | |
| Intact skin | 24 | | 0.0 |
| Intact skin | 72 | | 0.0 |
| Abraded skin | 24 | 0.0 | |
| Abraded skin | 72 | | 0.0 |
| | | Subtotal | 0.0 |
| | | TOTAL | 5.67 |

Irritation index then equals 5.67/4 or 1.42, the mild irritant classification. According to FDA, a product producing an irritation index of 5.0 or more is considered irritating to the skin and must be labled as such. This product was considered to rate very high for an effective solvent.

The Draize Eye Test, is analogous. Albino rabbits also were used, and 0.1 ml. of the substance was placed in one eye of the animal, the other eye, untreated, serving as a control. A series of nine rabbits was used. With the first three, treated eyes remained unwashed. The next three had the treated eye washed with 20 ml. of lukewarm water (approx. body temperature) ten seconds after the product was instilled in the eye, whereas the last three had the eye washed immediately after treatment. Ocular reactions were read with the unaided eye, or with a slit lamp, readings being made at 24, 48 and 72 hours after treatment. The cornea was scored on the basis of the density of the opacity and total area involved. The iris was scored on intensity or degree of inflammation, and the palphebral and remaining bulbar mucosae were scored on the extent of the chemosis, redness, and discharge. A total score is the sum of the scores for the cornea, iris and conjunctivae.

For the cornea, scoring is from 0 to 4 on degree of opacity (A); a score of 4 indicates that the iris in invisible, lesser scores indicate degrees of opacity for the iris. A second score (B) is given for the area of cornea involved in the opacity; one-quarter or less is scored as 1, less than half is 2, more than half is 3, and greater than three-quarters up to the full area is scored 4. Total score for cornea is the sum of A and B.

For the iris, a normal condition is rated 0, folds above normal, congestion, and/or swelling while the iris is still reacting to light is scored 1, and if there is no reaction to light, the score is 2. The total iris score is the reading, plus 5.

For conjunctivae, reading A is for redness. If vessels are normal, score 0, if they are definitely injected above normal, score 1; if they are diffuse, deeper crimson in color and vessels not easily discernable, score 2; for diffuse beefy red, score 3.

For chemosis (B), no swelling is scored 0, any swelling above normal (including nicitating membrane) is scored 1; obvious swelling with partial eversion of lids scores 2; swelling with lids up to half closed scores 3; swelling with lids half closed or more, to completely closed, scores 4.

For discharge (c), no discharge scores 0, any discharge different from normal scores 1, discharge with moistening of lids and hairs just adjacent to the lids scores 2, and discharge with moistening of the lids and hairs, and considerable areas around the eye is scored 3. The total conjunctival score is obtained by adding (A), (B), an (C) and multiplying by 2.

Results of the Draize test, as described above, are tabulated:

Table II

| | Mean Score of Group | | | | | | | | | | | | | | |
|---|---|---|---|---|---|---|---|---|---|---|---|---|---|---|---|
| | Unwashed Time in hours | | | | | Immediate Wash Time in hours | | | | | 10 Second Wash Time in hours | | | | |
| Structure | 24 | 48 | 72 | 96 | 108 | 24 | 48 | 72 | 96 | 108 | 24 | 48 | 72 | 96 | 108 |
| Cornea | 0.0 | 0.0 | 0.0 | — | — | 0.0 | 0.0 | 0.0 | — | — | 0.0 | 0.0 | 0.0 | — | — |
| Iris | 0.0 | 0.0 | 0.0 | — | — | 0.0 | 0.0 | 0.0 | — | — | 0.0 | 0.0 | 0.0 | — | — |
| Conjunctivae | 1.33 | 0.0 | 0.0 | — | — | 0.0 | 0.0 | 0.0 | — | — | 0.0 | 0.0 | 0.0 | — | — |
| | | Data evaluation* 0.004 Very slight irritant | | | | | Data evaluation 0.0 Non-irritant | | | | | Data evaluation 0.0 Non-irritant | | | |

Note: The index is obtained by dividing the total score in each column by 110. The Draize index is 0 for non-irritants, 0.1 to 0.2 for slight irritant, 0.3 to 0.4 for moderate irritant; 0.5 to 0.6 for irritant; 0.7 to 0.8 for highly irritating substances; and 0.9 to 1.0 for extremely irritating materials. For a solvent that is effective to remove such difficultly soluble materials as described above, the rating of "very slight irritant; is considered excellent. In conclusion, the independent test agency reported that the product of the present invention is considered non-irritating to the eyes.

Obviously, proportions may be varied and minor quantities of conventional materials which do not affect the properties of the cleaning composition may be added, as will readily be understood by those skilled in the art. The compositions of this invention may be used for many purposes other than those specifically mentioned above. It is intended by the claims which follow to cover the obvious changes in proportions of named ingredients, substitutions of equivalent ingredients, and/or the addition of immaterial of functionally inconsiderate quantities of other agents, as broadly as the state of the prior art properly permits.

What is claimed is:

1. A composition for removing contaminating resinous, gummy or tarry residues from surfaces without adversely affecting paints or varnishes, said composition being substantially non-irritating to the skin and eyes of human beings, which comprises, in combination, the following ingredients in weight proportions, as indicated, based on the weight of the whole composition:

A. about 5 to 92% of a base hydrocarbon oil of substantially the boiling range of kerosene, which is substntially free of objectionable odor and having not more than 5% of sulfonatable constituents, B. about 5 to 90% of a limonene type citrus distillate having high solvency for the contaminant and having a refractive index between about 1,4718 and 1.4722 at 20° C., with a specific gravity between about 0.838 and 0.843, having a resin content not more than about 0.10% and aldehyde content not in excess of about 0.90%, C. 0.5 to 6.0% of a skin lubricant selected from the class which consists of lanolin and wool grease, and D. 0.5 to 3% of a surface active agent to promote wetting of the contaminant by the composition.

2. Composition according to claim 1 in which the base oil is used in proportions of about 60 to 80%, the limonene type extract or distillate 20 to 35%, and the lubricant is about 2.0 to 3.5%.

3. Composition according to claim 1 in which the limonene product is a citrus distillate extract having a specific gravity of about 0.841, a refractive index of about 1.4719, and an aldehyde content not in excess of 0.5%.

4. A composition according to claim 3 in which the proportions of the limonene ingredient is about 26 to 27%.

5. A composition according to claim 1 in which the lubricant is present in proportions of 2.5 to 3.0% of the total.

6. A composition according to claim 1 in which the base oil comprises about 68 to 72% of the total, the limonene type material about 26 to 27%, and the lubricant about 2 to 3%.

7. A composition according to claim 1 in which the lubricant is lanolin.

8. A composition according to claim 1 in which the major portion of the composition is the base hydrocarbon oil, said oil being substantially odorless, the limonene ingredient is a toiletry grade extract, the lubricant is a refined lanolin and the surface active agent is a dialkyl alkali metal sulfs succinate.

9. A composition according to claim 1 in which the base oil is a deodorized paraffinic oil of the kerosene boiling range in proportions of about 70%, 26 to 27% of a soap grade limonene type extract from citrus peels, 2 to 3% of refined lanolin, and 0.5 to 1% of dioctyl sodium sulfasuccinate.

*10. A composition for removing contaminating resinous, gummy or tarry residues from surfaces without adversely affecting paints or varnishes, said composition being substantially non-irritating to the skin and eyes of human beings, which comprises, in combination, the following ingredients in weight proportions, as indicated, based on the weight of the whole composition:*

*A. about 60 to 80% of a base hydrocarbon oil of substantially the boiling range of kerosene, which is substantially free of objectionable odor and having not more than 5% of sulfonatable constituents;*

*B. about 20 to 35% of a limonene type citrus distillate having high solvency for the contaminant and having a refractive index between about 1.4718 and 1.4722 at 20° C., with a specific gravity between about 0.838 and 0.843, having a resin content not more than about 0.10% and aldehyde content not in excess of about 0.90%*

*C. about 2.0 to 3.5% of a skin lubricant; and*

*D. about 0.5 to 3% of a surface active agent to promote wetting of the contaminant by the composition.*

* * * * *

UNITED STATES PATENT AND TRADEMARK OFFICE

CERTIFICATE OF CORRECTION

PATENT NO. : Re. 29,649

DATED : May 30, 1978

INVENTOR(S) : Albert M. Farnsworth

It is certified that error appears in the above-identified patent and that said Letters Patent are hereby corrected as shown below:

In the Claims:

Claim 1 (b), Column 8, Line 12, delete "1,4718" and insert --1.4718--.

Signed and Sealed this

*Fourteenth* Day of *November 1978*

[SEAL]

*Attest:*

RUTH C. MASON
*Attesting Officer*

DONALD W. BANNER
*Commissioner of Patents and Trademarks*